United States Patent
Trifon

(10) Patent No.: US 7,328,435 B2
(45) Date of Patent: Feb. 5, 2008

(54) METHOD FOR DYNAMICALLY CHANGING ONE WEB PAGE BY ANOTHER WEB PAGE

(75) Inventor: Gal Trifon, New York, NY (US)

(73) Assignee: Eyeblaster Ltd., Ra'anana (IL)

( * ) Notice: Subject to any disclaimer, the term of this patent is extended or adjusted under 35 U.S.C. 154(b) by 722 days.

(21) Appl. No.: 10/116,345

(22) Filed: Apr. 4, 2002

(65) Prior Publication Data

US 2003/0023445 A1   Jan. 30, 2003

(30) Foreign Application Priority Data

Apr. 25, 2001   (IL)   ..................... 142815

(51) Int. Cl.
*G06F 9/44*   (2006.01)
*G06F 3/048*   (2006.01)

(52) U.S. Cl. ............... 717/171; 715/804; 715/854; 715/781

(58) Field of Classification Search ........... 709/232, 709/223–224; 715/513, 733
See application file for complete search history.

(56) References Cited

U.S. PATENT DOCUMENTS

| | | | |
|---|---|---|---|
| 6,278,448 B1* | 8/2001 | Brown et al. ............... | 715/866 |
| 6,460,079 B1* | 10/2002 | Blumenau ................... | 709/223 |
| 6,523,063 B1* | 2/2003 | Miller et al. ................ | 709/206 |
| 6,546,397 B1* | 4/2003 | Rempell ..................... | 707/102 |
| 6,988,241 B1* | 1/2006 | Guttman et al. ............ | 715/503 |
| 7,051,084 B1* | 5/2006 | Hayton et al. .............. | 709/219 |
| 2001/0010059 A1* | 7/2001 | Burman et al. ............. | 709/224 |
| 2002/0124100 A1* | 9/2002 | Adams ........................ | 709/232 |
| 2002/0138624 A1* | 9/2002 | Esenther ..................... | 709/227 |

FOREIGN PATENT DOCUMENTS

WO   WO01/44969   6/2001

OTHER PUBLICATIONS

Kings-Lynne, Christopher, "Implementing Cross-Domain Cookies", Nov. 28, 2000, www.phpbuilder.com/columns/chriskings20001128.php3?print_mode=1.*

Erik Hatcher, "Remote Scripting Using a Servlet", Feb. 01, 2001, pp. 1-7, http://www.ibm.com/developerworks/web/library/waresc/.*

* cited by examiner

*Primary Examiner*—Wei Zhen
*Assistant Examiner*—Chih-Ching Chow
(74) *Attorney, Agent, or Firm*—Cooper & Dunham LLP

(57) ABSTRACT

Method for dynamically changing the content of a first Web page by a second Web page, wherein the first Web page is downloaded by a Web browser from a first domain, and the second Web page is downloaded by the browser from a second domain. One or more commands/procedures are provided for dynamically changing the first Web page and for storing the commands/procedures within the first Web page, or as a separate Web page within the first domain. Whenever the second Web page is downloaded in combination with the first Web page, the commands/procedures identify the downloaded second Web page and change at least a portion of the content of the first Web page by executing visual operations that are associated with the downloaded second Web page.

9 Claims, 2 Drawing Sheets

METHOD FOR DYNAMICALLY CHANGING ONE WEB PAGE BY ANOTHER WEB PAGE

FIELD OF THE INVENTION

The present invention relates to the field of dynamic Web pages. More particularly, the invention relates to a method for dynamically changing a Web page by another Web page, wherein the Web pages have been downloaded from different domains.

BACKGROUND OF THE INVENTION

HTML (Hypertext Markup Language) is the set of markup objects inserted in a file (usually called a Web page) to be displayed by a Web browser. The markup tells the Web browser how to display a Web page's words and images for the user. Each individual markup object is referred to as a tag or object, and appears in the page between the "<" and ">" characters.

HTML documents are plain-text (also known as ASCII) files that can be created using any text editor. However, some sophisticated application programs enable an author to design Web pages on a WYSIWYG (What You See Is What You Get) basis, rather than editing the plain text.

The following example illustrates a simple Web page that displays the text "Hello world":

```
<HTML>
<HEAD>
<TITLE>Hello World</TITLE>
</HEAD>
<BODY>
<P align="center">Hello World</P>
<IFRAME src="http://www.company.com/banner.htm"></IFRAME>
</BODY>
</HTML>
```

Some of the tags must have corresponding end tags, which appear with the "/" character on their left.

A Web page viewed on a Web terminal (a computer-based system that is able to interpret and display Web pages) may comprise content originating from different companies and domains. For example, an HTML page from the www.ivillage.com domain may include content downloaded from the domain www.ivillage.com, as well as banners downloaded from the domain www. doubleclick. com. This manner of viewing a Web page content is carried out by using HTML tags contained in the HTML page. Each tag may point to a different domain, and thus, the content that is displayed on a Web browser (such as Internet Explorer and the like) running on a Web terminal is downloaded from the domains that the HTML tags point to.

A Web page can be referred to directly from a Web browser (by entering the Web page Uniform Resource Locator (URL), which is the "address" of a file in the Web) or can be embedded within another Web page in the form of an iFrame or Frame or Layer or other (there are also different names in different browsers).

The downloaded Internet page is not necessarily identical to the presented one, since an HTML file may include tags and commands that direct the browser to change the downloaded Web page prior to or after its display. "Changing" an Internet page by the Web browser can be carried out by adding text lines to this Web page, altering the text within said Web page, and so forth. A modification in a downloaded Web page prior to or after its display/execution will be referred to herein as "dynamic change".

For example, a downloaded HTML page may contain a command for "writing" 10 additional lines. Upon downloading this Web page, the Web browser starts to execute the commands. After executing the command for adding 10 lines, the modified Web page will comprise 10 additional text lines.

The combination of HTML enhancements, scripting language and interface that are used to deliver animation, interactions and dynamic changing on Web pages is called Dynamic HTML (DHTML).

An HTML page may contain other HTML objects such as Frames and/or inline Frames (iFrames) or any other HTML object terminology (the terminology being dependent on the Web browser displaying the HTML page). A Frame or iFrame, for example, is basically an HTML page that appears at a designated position and size in the containing HTML page. As described above, the main HTML page may be downloaded from one domain (for example: www.iVillage.com), while an iFrame within this HTML page may be downloaded from another domain (for example: www.doubleclick.com).

Due to security considerations on the Web browser, an HTML page that is downloaded from one domain cannot dynamically change an HTML page downloaded from another domain. Thus, referring to the previous example, the iFrame downloaded from www.doubleclick.com cannot contain commands that will change an HTML page downloaded from www.iVillage.com and vice versa.

Referring to the above example, DoubleClick provides banner services to several thousands of sites. Since DoubleClick already has banner links (which are usually iFrame) on all the sites using its services, DoubleClick prefers to be able to dynamically change the Web pages that include banners from DoubleClick, due to a variety of reasons, such as animation performed outside the banner boundaries. But since the iFrame in which the banner resides cannot access the page outside this banner, there are obstacles in embodying the animation.

It is therefore an object of the present invention to provide a method for dynamically changing a Web page downloaded from one domain by a Web page downloaded from another domain.

Other objects and advantages of the invention will become apparent as the description proceeds.

SUMMARY OF THE INVENTION

In one aspect, the present invention is directed to a method for dynamically changing the content of a first Web page by a second Web page, wherein the first Web page is downloaded by a Web browser from a first domain, and the second Web page is downloaded by the browser from a second domain, comprising:

Providing one or more command(s)/procedure(s) for dynamically changing the first Web page, and storing the command(s)/procedure(s) within the first Web page, or as a separate Web page within the first domain; and Whenever the second Web page is downloaded in combination with the first Web page, allowing one or more of the command(s)/procedure(s) to identify the downloaded second Web page and to change at least a portion of the content of the first Web page by executing operations that are associated with the dowloaded second Web page.

The performance of the command(s)/procedure(s) may be directed by parameters. The parameters may be passed by cookies and/or by JAVA applets. The second Web page may be an iFrame within the first Web page. Also, the secondweb page may include a tag that instructs the Web browser to load the separate Web page that resides within the first domain.

The first Web page may include a tag that instructs the Web browser to load the separate Web page that resides within the first domain. The second Web page and/or the first Web page and/or the separate Web page may be HTML objects within an HTML object tree downloaded by a Web Browser.

The first Web page and/or the second Web pages and/or the separate Web page may be a part of a set of HTML objects downloaded by the Web browser. The Web pages may be HTML based pages. The Web browser may be any system capable of displaying Web pages and executing commands embedded in the Web pages.

In another aspect, the present invention is directed to a computerized system having the capability of dynamically changing the content of a first Web page by a second Web page, in which the first Web page is downloaded by a Web browser from a first domain, and the second Web page is downloaded by the Web browser from a second domain, comprising:

One or more Web server(s), for hosting the first and second domains.

Software component(s) that include command(s)/procedure(s) for dynamically changing the first Web page, the software component(s) being a part of the first Web page or being a part of a separate Web page, and stored in the one or more Web server(s) as a part of the first domain; and A Web terminal, connected through a data network to the one or more Web server(s), by which HTML pages can be browsed and displayed, for downloading the second Web page in combination with the first Web page, by allowing the one or more of the command(s)/procedure (s) to identify the dowloaded second Web page and to change at least a portion of the content of the first Web page by executing operations that are associated with the dowloaded second Web page.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

There are a variety of ways to embed one Web page into another Web page, such as Frames and iFrames. However, for the sake of simplicity, we refer hereinafter to iFrame as the means of embedding one Web page into another.

An "imported" Web page presented within an iFrame in another Web page (referred to herein as the "main" Web page) is treated by the Web browser as an independent entity. Moreover, due to security considerations, the Web page presented within an iFrame cannot dynamically change other Web pages presented at the same time by said browser, unless the source of the page is the same domain (the term "domain" refers to the address of an Internet site).

It should be noted that not only an imported Web page cannot dynamically change a main Web page, but a main Web page cannot dynamically change an imported Web page, as well, if they are not from the same domain.

According to one embodiment of the invention, in order to overcome this obstacle, the commands for dynamically changing a main Web page should reside within another Web page on the same domain as that of the main Web page.

According to another embodiment of the invention, the commands for dynamically changing a main Web page are an integral part of this Web page.

However, these arrangements are not convenient, due to the fact that the commands may often be changed.

According to one embodiment of the invention, in order to add flexibility to the above-mentioned arrangements, the following steps should be taken:

Preliminary procedure: A package (which refers to a collection of routines, commands, etc.) that comprises instructions for dynamically changing Web pages is stored on the domain of the main Web page, or as a part of the main Web page.

Execution procedure: The imported Web page comprises commands for invoking the code of said package and/or parameters for directing the execution of the code of the package.

In this way, the company that owns the imported Web page (the one including the advertising banner, for example) can issue commands for dynamically changing the main Web page, even if the source of said Web pages originate from different domains.

As known to the skilled person, there are a variety of means for passing parameters between the main page and the imported page, such as cookies (information a Web site stores on the hard disk of the user for further use) and JAVA applets.

Figure 1:
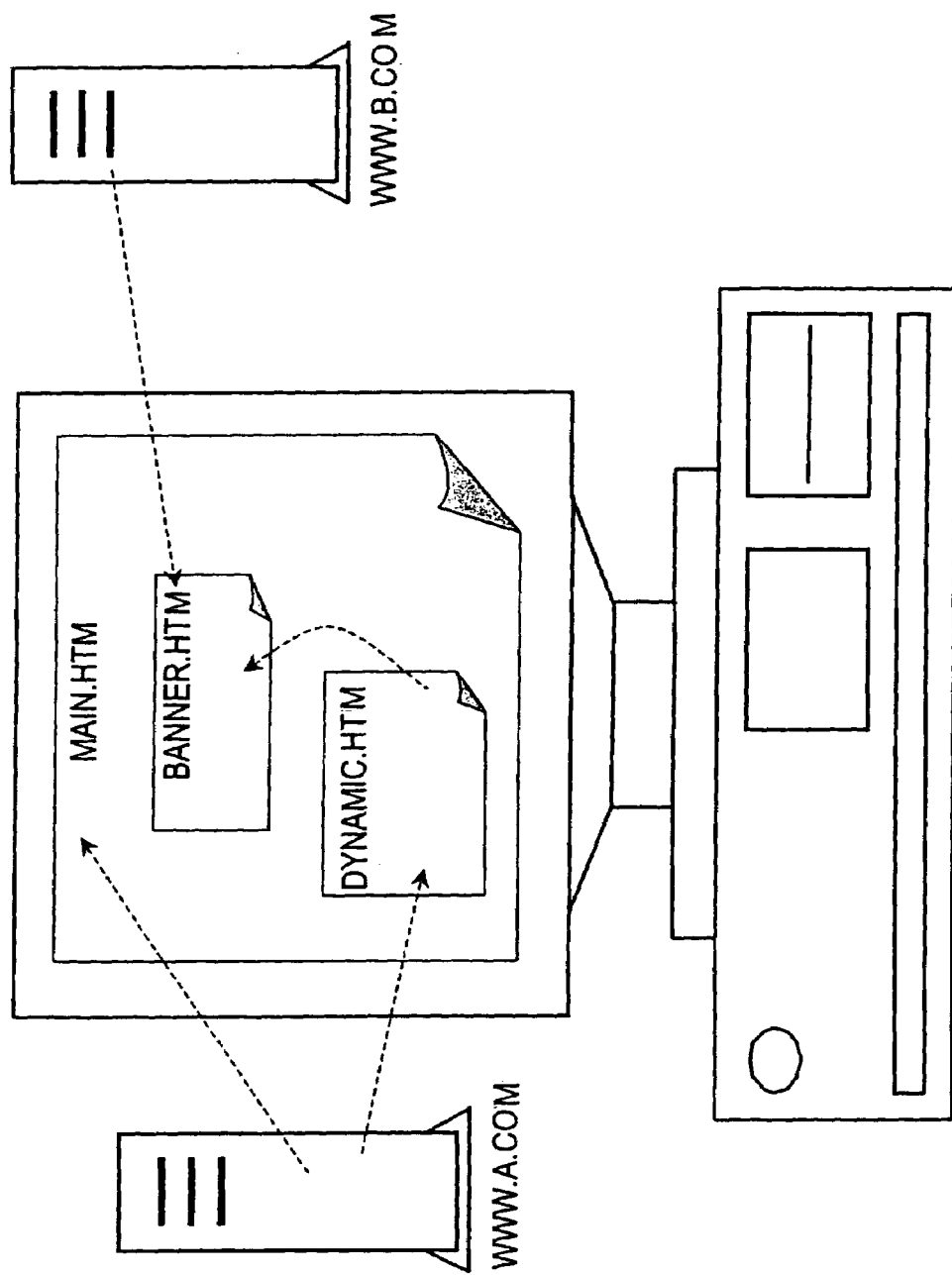
FIG. 1 schematically illustrates a method for dynamically changing a Web page downloaded from one domain by a Web page downloaded from another domain, according to a preferred embodiment of the invention.

FIG. 1 schematically illustrates a method for dynamically changing a Web page downloaded from one domain by a Web page downloaded from another domain, according to a preferred embodiment of the invention.

A Web browser presents the main Web page main.htm downloaded from the domain www.a.com. This Web page comprises a banner, which is an iFrame that presents the file banner.htm to be downloaded from www.b.com. Since banner.htm is downloaded from a different domain than www.a.com, any commands within banner.htm cannot dynamically change main.htm outside the banner's borders.

According to one embodiment of the invention, in order to allow banner.htm to dynamically change main.htm outside the banner's borders, the following steps should be taken:

Prior to displaying the main Web page main.htm, another Web page called dynamic.htm is installed in the same domain (www.a.com). This file consists of commands that can dynamically change main.htm since they are downloaded by the browser from the same domain.

Whenever main.htm downloads and displays banner.htm, banner.htm refers to dynamic.htm, and any commands within dynamic.htm are able to dynamically change the Web page main.htm.

In order to provide flexibility, dynamic.htm comprises a package with procedures for dynamically changing a Web page. These procedures are controlled by banner.htm. By transferring parameters to the procedures of dynamic.htm, banner.htm has a flexible ability to control dynamic changes in main.htm.

Of course, banner.htm may reside on www.a.com.

Note that the dashed arrows if FIG. 1 illustrate the source of the files.

Figure 2:
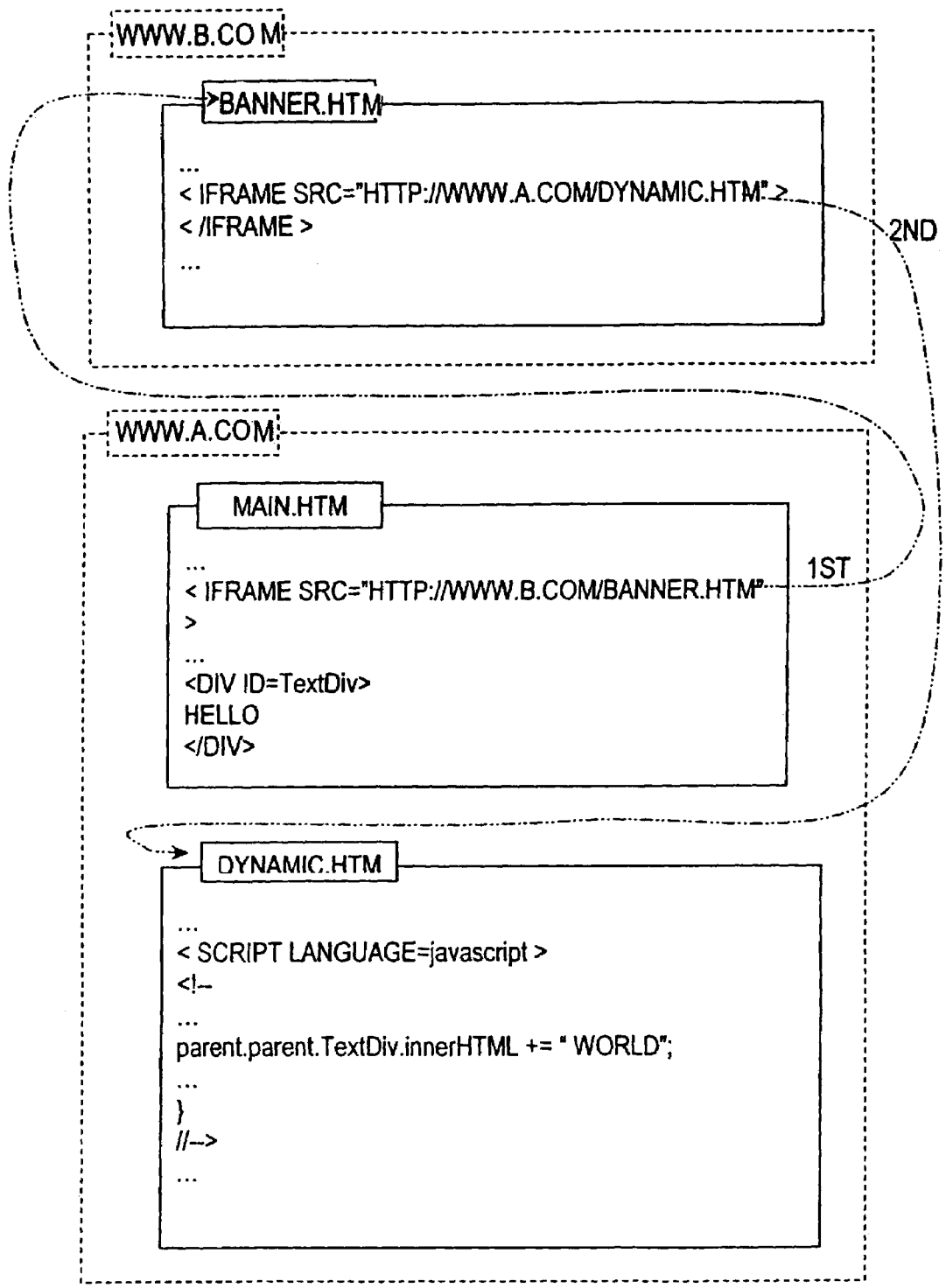
FIG. 2 schematically illustrates an example in HTML of dynamically changing a main Web page, according to a preferred embodiment of the invention.

FIG. 2 schematically illustrates an example in HTML of dynamically changing a main Web page, according to a preferred embodiment of the invention. The domains are represented as dashed squares. The domain www.a.com comprises the Web page main.htm and dynamic.htm. The domain www.b.com comprises the file banner.htm.

Whenever the file main.htm (that has been downloaded by a Web browser from www.a.com) is displayed by said browser, the <IFRAME src="http://www.b.com/banner.htm"> command is executed. That is, the file banner.htm is loaded from the domain www.b.com, and displayed/executed Since banner.htm refers to the file dynamic.htm residing on the domain www.a.com, dynamic.htm can dynamically change main.htm.

Another sample deals with a method for out-of-banner advertising. Eyeblaster Inc. (N.Y., USA) has developed a framework for out-of-banner advertising, which generates floating messages that appear superimposed on web pages. In order to enable the use of the product of Eyeblaster in a Web site, the Web site has to add Eyeblaster's HTJML tags into its HTML pages. These tags dynamically change Web pages on the user's machine in order to generate a floating message. The Eyeblaster tags point to the Eyeblaster domain, but since the tags reside on said Web site's pages, they can dynamically change them.

DoubleClick is an advertising network connected to a few thousand sites (each site has one or more iFrames originating from the DoubleClick domain on its web pages). In order to use the out-of-banner product as part of DoubleClick's services, sites that are connected to the DoubleClick network should add the Eyeblaster tags into their Web pages.

There are two ways this can be accomplished:
1. To add Eyeblaster tags to any Web page that uses DoubleClick's banners (referred herein as to "Site" Web page).
2. To add the Eyeblaster tags through existing iFrame tags that DoubleClick already features on the Site Web pages.

Of course, the second way is preferable, since it does not require any modification of Site Web pages. Also, through handling the iFrame, DoubleClick can very easily control the use of the Eyeblaster's product on Site Web pages.

The problem is that adding the Eyeblaster tags to the DoubleClick's iFrame cannot provide the requested result, since (due to security reasons) the Eyeblaster tags can only change the iFrame itself and not the site HTML pages on which the iFrame resides.

The solution is as follows:
1. To create an iFrame file that will reside on the Site domain and will be called Eyeblaster-bootstrap.htm. This file will contain a set of HTML commands that dynamically add the Eyeblaster tags into the Site Web pages on the user machine. Note that since this file is located on the Site domain, it has permission to do so.
2. Add the following HTML code to the DoubleClick iFrame:
   Include the Eyeblaster-bootstrap.htm as an iFrame within the DoubleClick's iFrame.
   Include additional Eyeblaster code that allows Double-Click to transfer information to the Eyeblaster tags (that are dynamically written to the Site Web Pages).

Once this is done, the following occurs:
1. When the Site page is loaded, the Web browser loads the content of the page which also includes the DoubleClick iFrame.
2. The DoubleClick iFrame includes the Eyeblaster-bootstrap.htm as an inner iFrame.
3. When loaded by the Web browser, the Eyeblaster-bootstrap.htm, dynamically adds the Eyeblaster tags on the Site page on the user's machine.
4. The DoubleClick iFrame transfers command information to the Eyeblaster tags through a cookie (or any other method available). This information can include, for example, which message to display.
5. The dynamically created Eyeblaster tags (in step #3) read the command information.
6. When appropriate, the Eyeblaster tags dynamically create an out-of-banner message according to the Eyeblaster system information and the information received through the DoubleClick iFrame Those skilled in the art will appreciate that a Web browser can be implemented on a variety of software and hardware platforms. Without losing generality, the term "Web browser" as used herein refers to any system capable of presenting Web pages, such as a computerized system, set-top box, browsing software, and so forth.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A method for dynamically changing the content of a first Web page by a second Web page, wherein said first Web page is downloaded by a Web browser from a first domain and contains a frame for displaying the second Web page, and said second Web page is downloaded by said Web browser from a second domain different from the first domain, comprising:
   a) storing at the first domain one or more command(s)/procedure(s) for dynamically changing said first Web page,
   b) upon downloading said second Web page, invoking and performing said one or more of said command(s)/procedure(s) stored at the first domains, performance of the command(s)/procedure(s) being directed by parameters; and
   c) executing the stored one or more of said command(s)/procedure(s) so as to change at least a portion of the content of said first Web page, wherein the second Web page is an iFrame within said first Web page.

2. A method according to claim 1, wherein the parameters are passed by cookies and/or by JAVA applets.

3. A method according to claim 1, wherein the second Web page includes a tag that instructs the Web browser to load the separate Web page that resides within the first domain.

4. A method according to claim 1, wherein the first Web page includes a tag that instructs the Web browser to load the separate Web page that resides within the first domain.

5. A method according to claim 1, wherein the second Web page and/or the first Web page and/or the separate Web page are HTML objects within an HTML object tree downloaded by a Web browser.

6. A method according to claim 1, wherein the first Web page and/or the second Web pages and/or the separate Web page are part of a set of HTML objects downloaded by the Web browser.

7. A method according to claim 1, wherein the Web pages are HTML based pages.

8. A method according to claim 1, wherein the Web browser is any system capable of displaying Web pages and executing commands embedded in said Web pages.

9. A computerized system having the capability of dynamically changing the content of a first Web page by a second Web page, in which said first Web page is downloaded by a Web browser from a first domain, and said second Web page is downloaded by said Web browser from a second domain, comprising:

one or more Web server(s), for hosting said first and second domains;

software component(s) stored in said one or more Web server(s) as a part of said first domain, the software component(s) including at least one command(s)/procedure(s) for dynamically changing said first Web page, said software component(s) being a part of said first Web page or a part of a separate Web page within said first domain; and a Web terminal, connected through a data network to said one more Web server(s), by which HTML pages can be browsed and displayed, for downloading said second Web page with said first Web page, by allowing said one or more of said command(s)/procedure(s) to identify the downloaded second Web page and to change at least a portion of the content of said first Web page by executing at least one of said one or more command(s) / procedure(s), wherein the second Web page is a frame within said first Web page.

* * * * *

UNITED STATES PATENT AND TRADEMARK OFFICE
CERTIFICATE OF CORRECTION

| | | |
|---|---|---|
| PATENT NO. | : 7,328,435 B2 | Page 1 of 1 |
| APPLICATION NO. | : 10/116345 | |
| DATED | : February 5, 2008 | |
| INVENTOR(S) | : Gal Trifon | |

It is certified that error appears in the above-identified patent and that said Letters Patent is hereby corrected as shown below:

Claim 1, column 6, line 52, change "domains" to --domain--.

Signed and Sealed this

Seventh Day of July, 2009

JOHN DOLL
*Acting Director of the United States Patent and Trademark Office*